Patented Dec. 31, 1940

2,226,573

UNITED STATES PATENT OFFICE 2,226,573

PROCESS OF MAKING CADMIUM RED PIGMENT

James J. O'Brien, Baltimore, Md., assignor to The Glidden Company, Cleveland, Ohio, a corporation of Ohio No Drawing. Application January 29, 1938, Serial No. 187,664

4 Claims. (Cl. 134—58)

The present invention relates to the production of cadmium red pigments, and more specifically it relates to the improvement in the color of cadmium red pigments, particularly of the cadmium sulfo-selenide type.

Cadmium sulfo-selenide is frequently made by precipitating a cadmium sulfate solution with a barium or sodium sulfide solution containing dissolved selenium to precipitate crude cadmium sulfo-selenide pigment. This precipitate is a dirty brown color and in order to develop the bright red color of the finished pigment it is necessary to properly calcine the precipitate. It frequently happens that off-color pigment is produced because of some unfavorable condition or conditions during calcination.

It has been found that if the crude pigment is calcined in the presence of a small amount of sulfur during the calcination that the production of off-color pigment is inhibited and also that the brightness of the pigment is improved. The sulfur may be added at any suitable stage during the process, the essential feature being that it be present during the calcination of the pigment. Excellent results are obtained if the sulfur is added to the sulfide solution or to the crude pigment before calcination, or both.

The following examples are illustrative of different procedures for carrying out the invention.

Example I 188 gallons of 35° Baumé cadmium sulfate solution was reacted with 415 gallons of 17° Baumé barium sulfo-selenide solution to which was added 5 to 10 pounds of sulfur. After precipitation was complete the precipitate was filtered, washed, dried and calcined at a temperature of 500 to 700° C. The materials used were sufficient to produce 1000 pounds of pigment, which had a bright red color. The pigment had a brighter color than that produced using the same amounts of materials without the added sulfur and repeated runs showed that the use of sulfur insured better color of the pigment than in the case of the pigment made by the corresponding process without the presence of sulfur during the calcination.

Example II

The procedure in this example was the same as in Example I except that from ¼ to 5 pounds of additional sulfur was added to the calcination charge to supplement that added in the barium sulfide solution. The color of the finished pigment was somewhat brighter than that in Example I.

Example III

Cadmium sulfate solution was precipitated with barium sulfo-selenide solution. After the strike was complete the precipitate was filtered and washed. From ¼ to 2 pounds of sulfur was then mixed with the crude pigment and the mixture calcined at 500 to 700° C. The finished pigment had a brighter color than the pigment produced without added sulfur.

The use of sulfur present during the calcination insures good color in the pigment, and results in a brighter color than the pigment produced without its use, even though the color in the latter case is up to standard. It is believed that the sulfur present during calcination takes up excess oxygen and produces reducing conditions beneficially affecting the color of the finished pigment. The sulphur also causes volatilization of excess or uncombined selenium, thereby improving and brightening the color. The uncombined selenium, if not removed, appears as black particles in the pigment, which decreases the brightness of the color. The use of sulfur according to the present invention brightens the colors but does not improve the tinting strength and in the case of the darker shades has a tendency to weaken the tinting strength. However, this tendency to weaken the tinting strength is not sufficient to bring the tinting strength below the accepted standard.

The amount of sulfur may vary depending upon the conditions. For example, in making the deeper shades more selenium is used, and consequently it is desirable to add more sulfur to insure removal of uncombined selenium. The amounts of sulfur added are preferably between 0.2% and 2.0% based on the weight of the pigment.

While certain materials, examples and procedures have been given it will be appreciated that various changes therein will be apparent to those skilled in the art. The pure cadmium sulfo-selenide may be produced according to the invention by using sodium sulfide with dissolved selenium in place of barium sulfide with dissolved selenium. Other changes may be made within the scope of the following claims, without departing from the invention.

What is claimed and desired to secure by Letters Patent of the United States is:

1. The process of preparing a cadmium red pigment which comprises providing an uncalcined crude pigment mass comprising cadmium sulfo-selenide and also containing elemental sulfur in the amount between 0.2 and 2.0% by weight of the crude pigment, and calcining the crude pigment mass.

2. The process of producing a cadmium sulfo-selenide pigment which comprises precipitating a cadmium sulfate solution with a solution of barium sulfide containing dissolved selenium, and calcining the resulting crude pigment in admixture with elemental sulfur in the amount between 0.2 and 2.0% by weight of the crude pigment.

3. The process of producing a cadmium sulfo-selenide pigment which comprises precipitating a cadmium sulfate solution with a water soluble sulfide solution containing dissolved selenium, and calcining the resulting crude pigment in admixture with elemental sulfur in the amount between 0.2 and 2.0% by weight of the crude pigment.

4. In a process of preparing an improved cadmium red pigment from an uncalcined crude cadmium sulfo-selenide pigment contaminated with uncombined selenium, the step of calcining said cadmium sulfo-selenide with sufficient elemental sulfur to volatilize all selenium not combined with the cadmium sulfo-selenide pigment during calcination and to improve the color and brightness of the calcined pigment.

JAMES J. O'BRIEN.